United States Patent
Nissan et al.

(10) Patent No.: US 11,487,519 B2
(45) Date of Patent: Nov. 1, 2022

(54) CODE CONVERSION METHOD AND SYSTEM

(71) Applicant: VALID NETWORK LTD, Beer Sheva (IL)

(72) Inventors: Kfir Nissan, Haifa (IL); Gilad Eisenberger, Haifa (IL)

(73) Assignee: Valid Network Ltd.

( * ) Notice: Subject to any disclaimer, the term of this patent is extended or adjusted under 35 U.S.C. 154(b) by 0 days.

(21) Appl. No.: 16/967,107

(22) PCT Filed: Feb. 6, 2019

(86) PCT No.: PCT/IL2019/050144
§ 371 (c)(1),
(2) Date: Aug. 3, 2020

(87) PCT Pub. No.: WO2019/155462
PCT Pub. Date: Aug. 15, 2019

(65) Prior Publication Data
US 2020/0364037 A1    Nov. 19, 2020

Related U.S. Application Data

(60) Provisional application No. 62/627,806, filed on Feb. 8, 2018.

(51) Int. Cl.
*G06F 8/41*    (2018.01)
*G06F 8/33*    (2018.01)
(Continued)

(52) U.S. Cl.
CPC ............. *G06F 8/4443* (2013.01); *G06F 8/33* (2013.01); *G06F 8/427* (2013.01); *G06F 8/73* (2013.01); *G06F 8/75* (2013.01)

(58) Field of Classification Search
CPC ... G06F 8/73; G06F 8/33; G06F 8/427; G06F 8/4443; G06F 8/51; G06F 8/53; G06F 8/75
See application file for complete search history.

(56) References Cited

U.S. PATENT DOCUMENTS 9,372,672 B1    6/2016  Thomas
2004/0225999 A1*  11/2004  Nuss ................ G06F 8/425
                                              717/114
(Continued)

FOREIGN PATENT DOCUMENTS

EP    2650785 A1    10/2010

OTHER PUBLICATIONS

Matt Suiche, "Porosity: A Decompiler For Blockchain-Based Smart Contracts Bytecode", Jul. 7, 2017, Comae Technologies (Year: 2017).*

(Continued)

*Primary Examiner* — Wei Y Zhen
*Assistant Examiner* — Amir Soltanzadeh
(74) *Attorney, Agent, or Firm* — Snell & Wilmer L.L.P.

(57) ABSTRACT

The present invention relates to a method of converting logic written in software code into text, comprising: converting the code to a structured format that represents the logic described in each function of said code as a tree of elements, and mapping the elements of the structured format into corresponding counterparts in a target language for obtaining a text translation of the structured format.

16 Claims, 3 Drawing Sheets

(51) Int. Cl.
    *G06F 8/73*           (2018.01)
    *G06F 8/75*           (2018.01)

(56)               References Cited

U.S. PATENT DOCUMENTS

| | | |
|---|---|---|
| 2006/0206789 A1 | 9/2006 | Bakman et al. |
| 2009/0064091 A1* | 3/2009 | Tonkin ............... G06F 8/42<br>717/104 |
| 2009/0083723 A1* | 3/2009 | Zawawy ............ G06F 9/4494<br>717/155 |
| 2012/0159442 A1* | 6/2012 | Dearman ............. G06F 8/73<br>717/123 |
| 2013/0227533 A1 | 8/2013 | Tonkin et al. |
| 2014/0173562 A1 | 6/2014 | Rothley et al. |
| 2016/0062753 A1* | 3/2016 | Champagne ......... G06F 8/51<br>717/137 |
| 2017/0039188 A1* | 2/2017 | Allen ................. G06F 8/73 |
| 2019/0236559 A1* | 8/2019 | Padmanabhan ..... G06F 21/64 |

OTHER PUBLICATIONS

Written Opinion of Search Authority dated Mar. 28, 2019 in International Application No. PCT/IL2019/050144.

* cited by examiner

21

```
function add(a: number, b: number) {
    var c;
    c = a + b;
    return c;
}
```

22

```
- FunctionDeclaration (name = 'add')
    o   Parameters
            ▪   (name = 'a', type = 'number')
            ▪   (name = 'b', type = 'number')
    o   Body
            ▪   VariableDeclaration (name='c')
            ▪   AssignmentOperation
                    •   Left
                            o   Ref: (name = 'c')
                    •   Right
                            o   BinaryOperation(operator = '+')
                                    ▪   Ref: (name = 'a')
                                    ▪   Ref: (name = 'b')
            ▪   Return
                    •   Ref: (name = 'c')
```

CODE CONVERSION METHOD AND SYSTEM

FIELD OF THE INVENTION

The present invention relates to the field of translation systems. More particularly, the invention relates to a method of converting logic written in software code (e.g., that may represent smart contract and/or other block-chain based agreements and logic instruments) into text such as an ordinary text in a target language such as the English language or any other human language.

BACKGROUND OF THE INVENTION

As more users are connected to the Internet and conduct their daily activities electronically, computer users may sometimes need to understand the content, meaning or logic of at least some of the software codes that they might ran into during their daily activities.

For example, distributed ledger systems provide a platform for the execution of smart contracts. Smart contracts typically include program instructions that may be executed in response to a transaction in the distributed ledger system addressed to the contract. Smart contracts may also represent legal contracts between users, with program functions of the smart contracts implementing terms, conditions, etc. of the legal contract. Unfortunately, many users of such distributed ledger systems may found the content of smart contracts and/or other block-chain based agreement and logic instruments not clear enough for them.

It is an object of the present invention to provide a system which is capable of allowing non-technical people to understand the content of software codes, e.g., set of instructions that form smart contracts.

It is another object of the present invention to provide a system which is capable of simplifying logic written as code to human language in a specific context to make it easier to examine for that specific need, for example, from a security standpoint, or a financial aspect.

Other objects and advantages of the invention will become apparent as the description proceeds.

SUMMARY OF THE INVENTION

The present invention relates to a method of converting logic written in software code into text, comprising: converting the code to a structured format that represents the logic described in each function of said code as a tree of elements, and mapping the elements of the structured format into corresponding counterparts in a target language for obtaining a text translation of the structured format.

According to an embodiment of the invention, the method further comprises applying refinement technique to increase the readability of the obtained text translation.

According to an embodiment of the invention, the structured format is an Abstract Syntax Tree (AST) structure.

According to an embodiment of the invention, the refinement technique is selected from the group comprising of: pattern matching, reordering, in-lining, flattening, or any combination thereof.

According to an embodiment of the invention, the pattern matching comprises converting a pattern into a higher-level translation that matches this pattern.

According to an embodiment of the invention, the reordering comprises changing the order of elements of the structure format.

According to an embodiment of the invention, the in-lining comprises bringing information to where it is used, thereby including a declaration of a function near where it is called.

According to an embodiment of the invention, the flattening comprises taking code that is split into several components that use inheritance and converting them to single component by flattening the hierarchy.

According to an embodiment of the invention, the logic written in software code is a smart contract of a distributed ledger system.

According to an embodiment of the invention, the method further comprises producing one or more logic diagrams describing the high-level or low-level logic of the code.

In another aspect, the present invention relates to a system, comprising: a) at least one processor; and b) a memory comprising computer-readable instructions which when executed by the at least one processor causes the processor to execute a translation process, wherein the translation process:
  i. converts logic written in software code to a structured format that represents the logic described in each function of said code as a tree of elements; and
  ii. maps the elements of the structured format into corresponding counterparts in a target language for obtaining a text translation of the structured format.

DETAILED DESCRIPTION OF THE INVENTION

Various terms are used throughout the description and the claims which should have conventional meanings to those with a pertinent understanding of computer programming. Additionally, various descriptive terms are used in describing the exemplary embodiments in order to facilitate an explanation of them, and to aid one's understanding. However, while the description to follow may entail terminology which is perhaps tailored to certain computing or programming environments, such as Solidity (i.e., an object-oriented, high-level language for implementing smart contracts that is designed to be executed by a block-chain-based platform such as Ethereum) or software codes at other languages andcomputer systems, it will be appreciated by a person skilled in the art that such terminology is employed in a descriptive sense and not a limiting sense. Where a confined meaning of a term is intended, it will be explicitly set forth or otherwise apparent from the disclosure.

Reference will now be made to several embodiments of the present invention, examples of which are illustrated in the accompanying figures for purposes of illustration only. One skilled in the art will readily recognize from the following description that alternative embodiments of the program modules and code-to-text conversation methods illustrated herein may be employed without departing from the principles of claimed invention.

Figure 1:
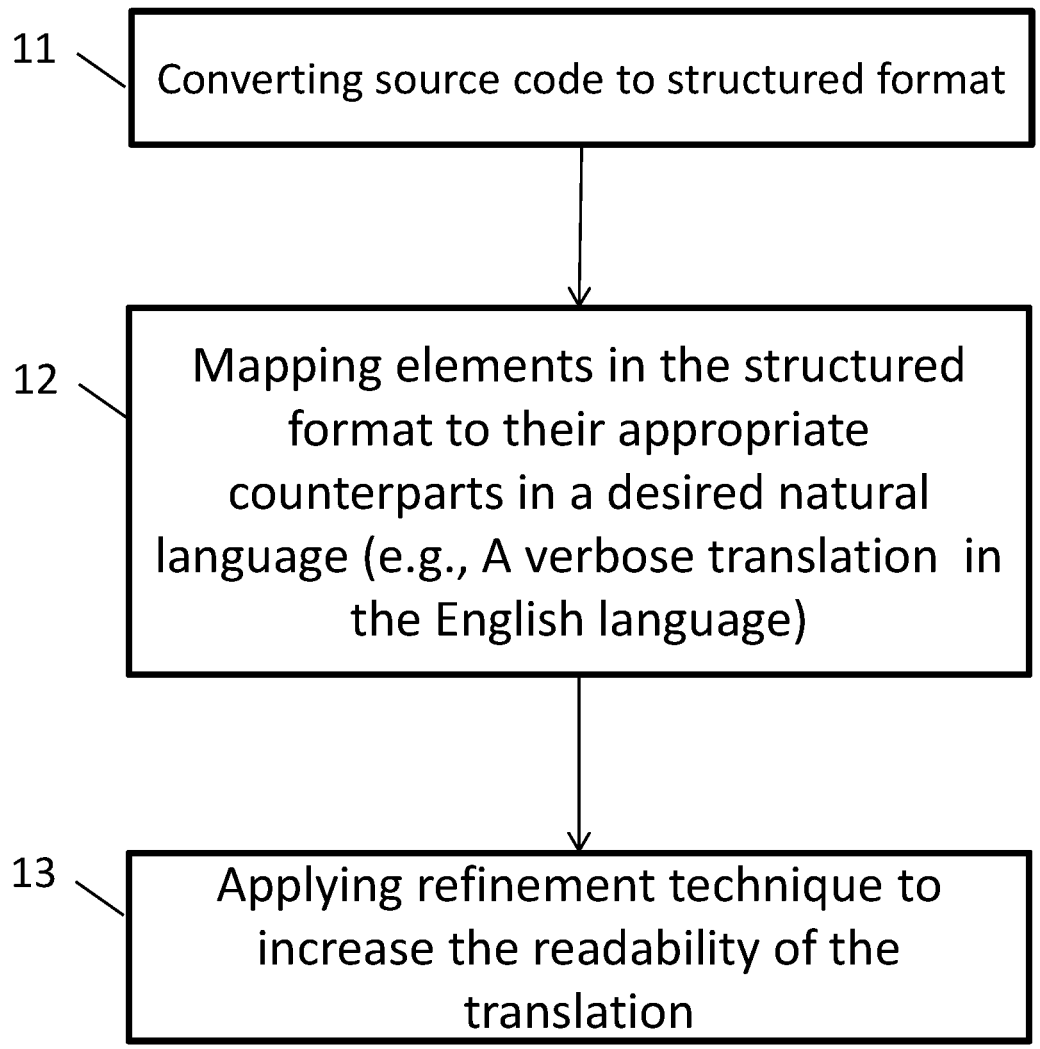
FIG. 1 is a flow chart generally illustrating the method of the invention.

FIG. 1 schematically illustrates in a flow chart form the translation process of converting logic written in software code into text, according to an embodiment of the invention. In particular, the method involves transforming logic written in software code that describes a contract (e.g., a smart contract) into a contract-like document written in human language such as English.

According to an embodiment of the present invention, the process may involve the following steps:

Converting logic written in software code to a structured format (step 11), such as an Abstract Syntax Tree (AST) structure;

Mapping elements in the structured format to their appropriate counterparts in a target language (step 12), such as the English language, thereby obtaining a verbose translation of the AST structure. For example, the mapping may involve the matching of known patterns used in software for contract-type logic with their equivalent human language sentences; and Applying refinement technique to increase the readability of the obtained verbose translation (step 13), i.e., transforming the verbose translation to concise translation.

The above steps will be described in further details hereinafter. However, while the invention will be described in the general context of program modules or codes that execute in conjunction with an application program that runs on an operating system on a computer system that is associated with smart contracts in distributed ledger systems, those skilled in the art will recognize that the invention may also be implemented in combination with other program modules. The functions described herein may be performed by executable code and instructions stored in computer readable medium and running on one or more processor-based systems. Embodiments of the invention may be implemented as a computer process, e.g., a computer system that encodes a computer program of instructions for executing the computer process.

According to an embodiment of the present invention, the translation process uses conversion of logic written in software code (e.g., a source code) to an AST structure, as a first step (step 11). An AST is an internal format used by compilers to describe code during the compilation process. A compiler converts the code, provided as text, to an AST, and then parses the AST to generate machine code in binary format. Since the AST is a structured format, it is easy for the compiler to use when generating machine code in binary format.

According to an embodiment of the present invention, converting to an AST format during translation has several uses and advantages:

An AST structure is well structured, and so is easy to transform to other representations.

An AST is relatively easy to generate, since compilers can output this interim format when compiling. The compiler can produce this output for any code that it can compile—so this technique works for any code. Utilizing part of an existing tool to perform this translation makes the process robust and easier to implement.

AST is still representative of the software code—it retains almost all data in the original code such as variable names, comments, order of functions, etc. This means that the translation can describe the software code accurately.

AST can be easily mapped to the original code. This means any created translation can be mapped back to the software code used as origin.

AST is an internal format used by the compiler and is generally just used as a step in generating machine code.

Figure 2:
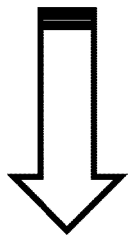
FIG. 2 shows a simplified example of translating an "add" function from pseudo code format into AST structure, according to an embodiment of the invention.

The above conversation embodiment of a software code to a structured format in AST will be better understood through the following illustrative and non-limitative example for a pseudo-code of an "add" function (see also FIG. 2 for an illustrative representation of the conversion, where pseudo-code of an "add" function is indicated by numeral 21 and its AST format is indicated by numeral 22). Such a pseudo-code can be part of a given smart contract code package that is provided by a user who want to translate it to contract-like document in more understandable human language:

```
function add(a: number, b: number) {
    var c;
    c = a + b;
    return c;
}
```

A possible AST of such an "add" function could look something like (the following conversion of the software code of the "add" function is extremely simplified for readability):

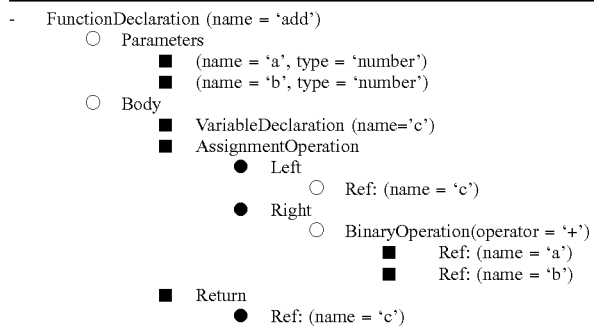

This example of AST represents the logic described in the "add" function as a tree of elements. However this is a very simplified version of what an actual AST looks like.

The simplification is designed to convey that the AST contains all the information in the code in a more structured manner.

Using the AST, the translation process can generate a very technical and verbose translation by converting elements in the AST to their appropriate English counterparts (step 12).

This consists of creating a table of mappings from elements in the AST to an appropriate description/translation of their underlying intent. For example, a BinaryOperation with an operator of "+" could be translated to "the addition of {left} and {right}".

Assuming a complete mapping of all possible elements in the AST is created, performing the conversion on the entire AST would produce a translation that is complete. That is, it includes all the logic in the original AST.

Since the translation is created directly from the AST, and is created using a direct mapping, it would create a translation that is very verbose and detailed, and in many ways difficult to read. It would still be structured like code (function invoked in one location would be defined in another place in the translation). This requires skills and approaches usually used for understanding code, and would mean the translation is not accessible to those without the skills in understanding this type of logic.

```
For example, see the following code of the functions "add" and "add4":
function add(a: number, b: number) {
    var c;
    c = a + b;
    return c;
}
function add4(a: number, b: number, c: number, d: number) {
    var result;
    result = add(add(a, b), add(c, d));
    return result;
}
```

Given the above code, a possible verbose translation could look something like:

"Create a function named add that receives as parameters: 'a'—a number, 'b'—a number. This function performs the following steps:
1) declare a variable 'c'.
2) set 'c' to be the addition of the parameter 'a' and the parameter 'b'.
3) set this function's result to be the value of 'c' and end the function.

Create a function named add4 that receives as parameters: 'a'—a number, 'b'—a number, 'c'— a number, 'd'—a number. This function performs the following steps:
1) declare a variable 'result'
2) set 'result' to be the result of invoking the add function, passing the result of invoking the add function passing 'a' and 'b' as parameters, and the result of invoking the add function passing 'c' and 'c' as parameters, as parameters.
3) Set this function's result to be the value of 'result' and end the function."

While this translation is accurate and full, it does not clearly allow a person to understand what the add4 function does (adds 4 numbers together). As such, additional refinements are further required.

Refinement techniques are a set of methods that can be used to improve the output translation in a way that greatly impacts its usefulness for non-technical users (step 13). The goals of the refinement technique are to increase the readability of the translation as much as possible. This would, in most cases, also involve shortening the actual length of the translation text, though that is not required.

According to an embodiment of the present invention, one or more of the following techniques can be used to refine the output:

Pattern Matching. This technique allows converting a pattern into a higher-level translation that matches this pattern. Since a pattern can be large or small, this can have a significant impact on translation readability.

An example for a simple pattern would be converting "temp=a; a=b; b=temp" into a swap logic.

An example for a complex pattern would be identifying a well-known code snippet, such as transferring tokens from one address to another (normally ~15 lines of code), and translating that well-known implementation into a single line translation ("transfer X tokens from {from} to {to}").

Reordering. The translation process can change the order of elements when those do not have a technical meaning. For example, changing the order of function declarations to have important methods appear first, or have related functions appear together.

In-lining. The translation process can, when useful, include the declaration of a function near where it is called. This can make understanding function use significantly easier by bringing information to where it is used.

Flattening. This technique takes code that's split into several components that use inheritance and converts them to single component by flattening the hierarchy. This means there is only one component to understand without having to understand how it is composed of base components.

Figure 3:
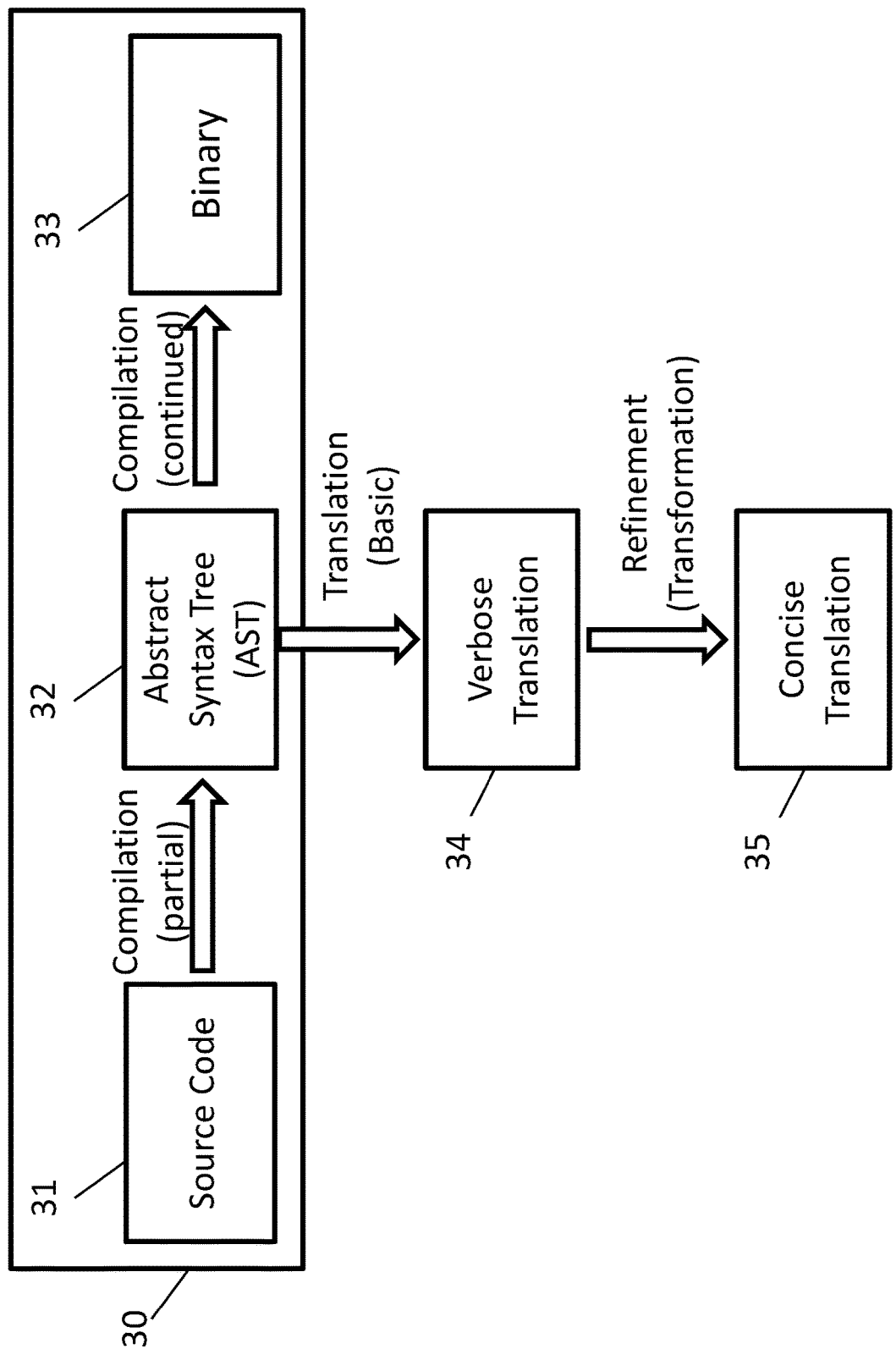
FIG. 3 is a block diagram generally illustrating an embodiment of the invention.

FIG. 3 is a block diagram generally illustrating an embodiment of a system for converting code to text, according to an embodiment of the invention. A compiler 30 converts a source code 31, provided as text, to an AST 32, and then parses the AST 32 to generate machine code in binary format 33. The system converts AST 32 to verbose translation 33 by mapping elements in the AST 32 to their appropriate counterparts in a target language (e.g., in the English language). Upon completion of the verbose translation 33, the system applies refinement method(s) to transform the verbose translation 33 to concise translation 34.

The translation process detailed above is a direct translation of code to a target language, covering the basic logic of a smart contract as defined in the source code 31. However, this translation lacks context, which can be used to greatly improve the quality of translation.

According to an embodiment of the invention, a basic form of context could be the intended use of the smart contract. The user's interest in the smart contract, and why he would like to understand the contract, allows generating translations that are more fitting to the user's needs. For example, when assessing a contract for financial viability, that is, whether the financial model makes sense, edge cases where the smart contract would behave differently are of lesser importance. On the other hand, when assessing a smart contract for bugs or security issues, these cases should be highlighted or given additional focus.

According to an embodiment of the invention, a more advanced form of context is the context of a specific operation relating to this code. While the translation described until now described the logic under all cases, a translation could translate only a single case, and how this logic would apply to it. Looking back at the example of the "add" function, our initial translation described this as a function that could add any numbers. However, when examining an actual run of this function, it doesn't add two unknown numbers—it adds two known values—and these values can be included in the translation.

Under this case, the translation logic is not translating the potential logic of a smart contract, but rather translating the logic the contract would use or has used processing a specific case. This means the translation can remove sections of the contract logic that are irrelevant in the specific context (such as an "if" statement that was not taken, its body might not really matter only why it wasn't taken).

The translation process of the present invention may translate the smart contract logic under many different contexts and assist non-programmers in understanding specific cases and how they run through the contract.

According to an embodiment of the present invention, the output language created by the translation does not necessarily need to be text. As an example, the translation could produce various logic diagrams describing the high- or low-level logic of the contract. An example of such possible output would be to produce a Business Process Model and Notation (BPMN) model out of the smart contract or any other form of graphical representation that is suitable for specifying business processes in a business process model. Such output would enable producing a model in a standard language that describes the logic of the contract.

As will be appreciated by the skilled person the process described hereinabove results in a system which is capable of allowing non-technical people to understand the content of smart contracts, as it simplifies logic written as code to human language in a specific context to make it easier to examine for that specific need, for example, from a security standpoint, or a financial aspect.

All the above description and examples have been given for the purpose of illustration and are not intended to limit the invention in any way. Many different mechanisms, methods of transforming logic written in software code into a readable text in a target language, electronic and logical elements can be employed, all without exceeding the scope of the invention.

The invention claimed is:

1. A method of converting a smart contract into a target human language, the method comprising:
   providing a logic written in a software code that represents the smart contract;
   providing known values to the logic;
   executing the logic using the known values to generate a context specific output;
   converting the software code to a structured format that represents the logic described in each function of said software code as a tree of elements, wherein converting the software code to the structured format comprises converting portions of the software code used to generate the context specific output; and
   mapping the tree of elements of the structured format into corresponding counterparts in the target human language including a non-programming language for generating a verbose translation of the structured format that simplifies the logic written as the software code to the target human language.

2. A method according to claim 1, further comprising applying a refinement technique to increase a readability of the verbose translation.

3. A method according to claim 1, wherein the structured format is an Abstract Syntax Tree (AST) structure.

4. A method according to claim 2, wherein the refinement technique is selected from a group comprising of: pattern matching, reordering, in-lining, flattening, or any combination thereof.

5. A method according to claim 4, wherein the refinement technique comprises pattern matching, and the pattern matching comprises converting a pattern into a higher-level translation that matches the pattern.

6. A method according to claim 4, wherein the refinement technique comprises reordering, and the reordering comprising changing an order of elements of the structured format.

7. A method according to claim 4, wherein the refinement technique comprises in-lining, and the in-lining comprises bringing information to where it is used, thereby including a declaration of a function near where it is called.

8. A method according to claim 4, wherein the refinement technique comprises flattening, and the flattening comprises taking code that is split into several components that use inheritance and converting the several components to a single component by flattening a hierarchy.

9. A method according to claim 1, wherein the logic written in the software code represents the smart contract of a distributed ledger system.

10. A method according to claim 1, further comprising producing one or more logic diagrams describing a high-level or a low-level logic of the software code.

11. A system, comprising:
   a) at least one processor; and
   b) a memory comprising computer-readable instructions which when executed by the at least one processor causes the processor to execute a translation process, wherein the translation process:
   i. provides known values to a logic written in a software code that represents a smart contract;
   ii. executes the logic using the known values to generate a context specific output;
   iii. converts the software code to a structured format that represents the logic described in each function of said software code as a tree of elements, wherein converting the software code to the structured format comprises converting portions of the software code used to generate the context specific output; and
   iv. maps the tree of elements of the structured format into corresponding counterparts in a target human language for generating a verbose translation of the structured format, wherein the target human language is a non-programming language.

12. A non-transitory computer-readable medium comprising instructions which when executed by at least one processor causes the processor to perform the method of claim 1.

13. A method according to claim 1, further comprising removing sections of the software code not used to generate the context specific output.

14. A method according to claim 1, wherein converting the software code to the structured format comprises converting only portions of the software code used to generate the context specific output, and omitting portions of the software code not used to generate the context specific output.

15. A method according to claim 1, further comprising parsing the structured format to generate machine code in a binary format.

16. A method according to claim 1, further comprising producing a logic diagram comprising the target human language.

* * * * *